Dec. 15, 1964 K. H. OLSEN ETAL 3,161,861

MAGNETIC CORE MEMORY

Filed Nov. 12, 1959 2 Sheets-Sheet 1

INVENTORS
KENNETH H. OLSEN
RICHARD L. BEST
BY
Blair, Spencer & Buckles
ATTORNEYS INVENTORS
KENNETH H. OLSEN
RICHARD L. BEST
BY
Blair, Spencer & Buckles
ATTORNEYS 3,161,861
MAGNETIC CORE MEMORY Kenneth H. Olsen, Bedford, and Richard L. Best, Wayland, Mass., assignors to Digital Equipment Corporation, Maynard, Mass.

Filed Nov. 12, 1959, Ser. No. 852,274
22 Claims. (Cl. 340—174)

Figure 1:
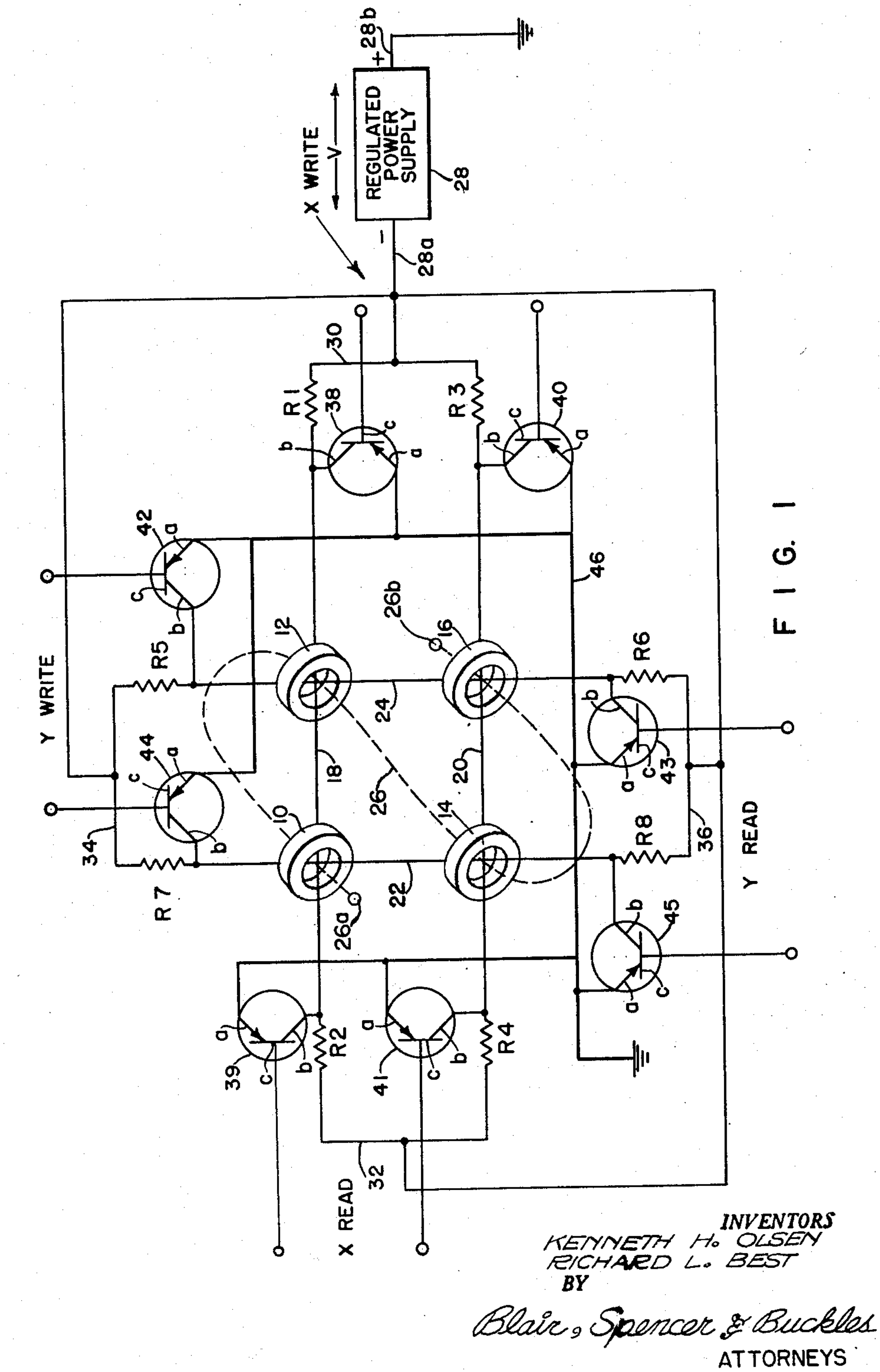

This invention relates to an improved magnetic core memory of the type used in digital data processing equipment, and more particularly, it relates to a magnetic core memory provided with improved reliability in the writing and reading processes in which information is fed into the memory and retrieved from it. Novel reading and writing circuits operated by constant voltage sources provide greatly improved control of magnetization of the individual cores and at the same time result in substantially lower fabrication and maintenance costs.

A magnetic core memory comprises a plurality of toroidal cores of magnetic material having a substantially rectangular hysteresis loop. With a magnetic characteristic of this nature, if a core is magnetized in one direction and a magnetic field produced by current through an electrical conductor is applied to reverse the direction of magnetization, the magnetization ideally will not change until the current reaches a certain critical value. When the current reaches this point, the magnetization reverses completely and reaches its maximum value in the direction opposite to its original direction. A reverse current of the critical value will then cause the magnetization to assume its original direction. The two directions of magnetization may in binary nomenclature be termed the ZERO and ONE directions. Thus, if a core is magnetized in the ZERO direction, it stores a ZERO, and in the ONE state it stores a ONE.

Assuming that the critical field necessary to reverse the magnetization of a core is produced by one unit of current through a conductor passing through the core, a pair of conductors may be used, each of which carries one half unit of current. If a half unit of current is passed through either of the conductors and not the other, there will be no change in magnetization, and therefore the binary state of the core will not be changed. However, if current of the proper direction is passed through both conductors, there will be a total of one unit of current, sufficient to reverse the magnetization.

The individual magnetic cores are arrayed in rows and columns, and a single conductor is passed through each core in a column; other conductors pass through each core in each row. Each row conductor intersects each column conductor at one core, that is, at the intersection of the corresponding row and column of cores is the only core through which both conductors pass. Therefore, an individual core may be selected by passing half units of current through the column and row conductors passing through it. There will thus be a total of one unit of current through the core, and if the current generates a field opposing the direction of magnetization of the core, it will be sufficient to reverse the magnetization and thereby change the binary state of the core. The other individual cores through which the two conductors pass will encircle only a half unit of current, and therefore their states will not be affected.

Thus, in order to store an item of information in a core, the row and column conductors passing through the core are selected, and then a pulse of current is passed through each of the two conductors in the proper direction to obtain magnetization corresponding to the information to be stored. More specifically, if the core is in the cleared or ZERO state and a one is to be stored in it, the current is passed in the ONE direction to magnetize the core in the corresponding ONE direction.

The information is retrieved from the cores by means of a sensing conductor which is threaded through each of the cores. The row and column conductors passing through a selected core are energized with half units of current illustratively having a direction corresponding to the ZERO state in the core. If a one is stored in the core, the magnetization of the core will change from the ONE to the ZERO state, and this will induce a voltage in the sensing winding. If a ZERO is stored in the core, there will be no change in magnetization, and therefore there will be no voltage induced in the sensing conductor. Thus, the presence or absence of a voltage pulse in the sensing conductor indicates the state of the individual core prior to interrogation. The process of storing information in a memory is termed "writing" and recovery of the information is termed "reading."

Errors in storing and retrieving information in magnetic core memories largely result from reading and writing currents which are either too large or too small. The hysteresis or magnetization curves for the cores are not exactly rectangular. That is, as the magnetic field produced by the current through a conductor is increased toward the value corresponding to maximum magnetic flux, the magnetization does not suddenly shift from saturation in one direction to saturation in the other direction, as would be the case with an ideal rectangular magnetization characteristic. Instead, the magnetization changes over an appreciable range of current, and any value of current in this range will shift the magnetization of the core somewhat, though only a relatively large current (one unit) will shift it to the fullest possible extent (saturation).

Changes in magnetization resulting from current in this range will result in output voltages in the sensing conductor which in some cases are large enough to indicate a complete shift in magnetization and in other cases are insufficient to do so. Therefore, if these magnetization shifts are obtained with two half units of current, i.e., when the core is selected by current in both the column and row conductors passing through it, the output voltage may be insufficient to indicate a change in magnetization even though the direction of magnetization requires such an indication. On the other hand, if a half unit of current, i.e., the current carried by a single row or column conductor through an unselected core, falls within this region, there may be a sufficient change in the magnetization of the core to give rise to an output voltage incorrectly indicating the information stored in a selected core.

In order to avoid errors of this type, the individual conductor currents must be maintained below the range of ambiguity while a full unit of current, i.e., the sum of the currents carried by the row and column conductors through a selected core, must be kept above this range. The conductor currents must therefore be controlled within fairly narrow tolerance limits. This problem is aggravated by the fact that the magnetization characteristics of the cores are affected by temperature, and to minimize errors in the face of temperature change, the tolerance limits for the current must be narrowed still further. The current should also be varied to compensate, at least in part, for such changes in core characteristics. The problem is further complicated by the fact that the characteristics of individual cores vary, and this imposes an additional limitation on the range of variation permitted the column and row currents.

Prior to our invention, the currents in core memories have been controlled by various vacuum tube and transistor-operated sources connected in a variety of circuit configurations. These circuits are relatively prone to error of the above type and, as a result, must be carefully checked and adjusted at frequent intervals in order to minimize such errors. A further contributing factor to errors of this type is the requirement that the column and row conductors carry currents in opposite directions for the reading and writing functions. Vacuum tube and transistor circuits of the types used prior to our invention are difficult to operate in two directions, and careful control of the current level is particularly troublesome under these conditions. As an alternative, separate sources may be provided for the reading and writing functions. This increases the complexity and cost of the equipment as well as the number of currents which must be subjected to rigorous control. Another problem results from the necessity of keeping the timing of the current pulses through the row and column conductors following a triggering or input pulse to the memory within cetrain limits in order to provide correct timing of the output pulses from the sensing conductor.

Accordingly, it is a principal object of our invention to provide a magnetic core memory overcoming the various deficiencies in prior memories enumerated above. A more specific object of the invention is to provide a magnetic core memory in which the row and column currents are readily controlled to minimize errors resulting from partial changes in magnetization of the cores. Another object of our invention is to provide a memory of the above character in which the timing of the current pulses through the conductors is readily controlled within desired limits. Another object of our invention is to provide a memory of the above character which requires a minimum amount of maintenance and adjustment. A further object of the invention is to provide a memory of the above character requiring a minimum number of adjustments to regulate the various conductor currents and thereby adapted for automatic regulation to compensate for changes in temperature and other environmental factors. Yet another object of our invention is to provide a memory of the above character requiring a minimum number of components in the current-controlling circuits and thereby providing savings in fabrication costs. A still further object of our invention is to provide current-controlling circuits for memories of the above type. Other objects of our invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 2:
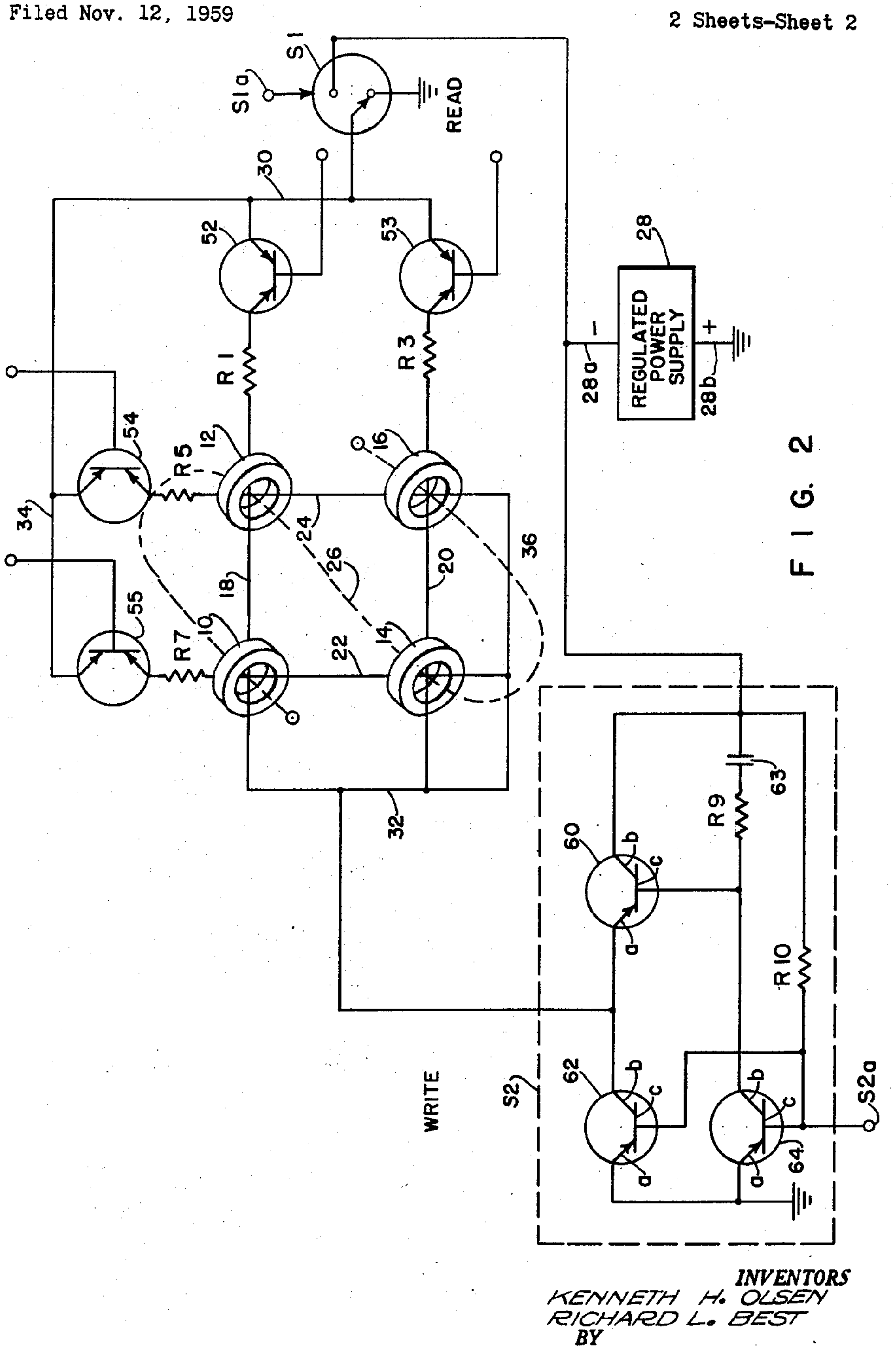

For a fuller understanding of the nature and objects of the invention, reference should be had to the following detailed description, taken in connection with the accompanying drawings, in which:

FIGURE 1 is a schematic diagram of a magnetic core memory embodying the principles of our invention, and FIGURE 2 is a schematic diagram of a second embodiment of a magnetic core memory made according to our invention.

In general, our invention makes use of constant voltage sources in supplying current for the magnetizing conductors. These sources include well-regulated power supplies and low impedance switches which connect the power supplies to pass currents through selected conductors in the appropriate directions for the reading and writing functions. In prior circuits of this type, constant current sources have generally been used. Switches in series with each of the row and column conductors route currents from the sources through the conductors passing through the selected cores. Relatively complex circuits are used to provide the constant current characteristics of the sources. Compensation for changes in the characteristics of the cores due to temperature changes causes further complications. The error rates of the prior circuits have been found to increase considerably as the speed of operation is advanced, and this has been a serious problem in the design of computers adapted to perform consecutive operations at rates of several megacycles per second.

In our memory circuits, current control is provided by means of resistors connected in series with the various conductors. The values of these resistors are such that, in combination with the inductances of the lines, they provide the correct time constant for appropriate rise time of the current pulses through the lines. In other words, the inductive properties of the lines themselves are combined with the resistors to regulate timing of the output pulses generated in the sensing conductor.

With the correct timing of the pulses thus set, the maximum values of the currents through the lines are controlled by setting of the voltage from the regulated supply. The maximum current follows the simple Ohm's Law relationship and thus depends on the applied voltage and the resistances of the resistors connected to the individual row and column conductors. The resistances of the conductors and the individual switches are so low as to be negligible in comparison with the resistances of the series resistors, and therefore variations in the switch and conductor resistances do not affect the currents passed by them. High speed operation of our circuits is enhanced by elimination of the effect of shunting capacitances as described below. Further advantages of our invention are the requirement of but a single power supply for both reading and writing currents in both the column and row conductors, and simplicity in the circuitry, resulting in considerable savings in fabrication costs.

In FIGURE 1 we have illustrated a four core memory incorporating the principles of our invention. The memory includes magnetic cores 10, 12, 14 and 16 encircling X (row) conductors 18 and 20 and Y (column) conductors 22 and 24. A sensing conductor 26 is threaded through each of the cores 10–16, and therefore across its terminal 26*a* and 26*b*, the conductor 26 registers voltages induced by changes in magnetization of the individual cores.

The driving circuit for the memory of FIGURE 1 includes a regulated power supply 28, an output terminal 28*a* of which is connected to each end of each of the conductors 18–24 by means of busses 30, 32, 34 and 36 and resistors R1–R8. Line-selecting switches in the form of transistors 38–45 are connected between the ends of the conductors 18–24 and the other terminal 28*b* of the power supply 28 by way of a grounding bus 46, as indicated in the drawing.

The transistors 38—45, whose emitters, collectors and bases are indicated by the subscripts *a*, *b* and *c*, respectively, are illustratively shown as p-n-p transistors, and therefore their emitters are connected to the bus 46 and their collectors are connected to the ends of the lines 18—24, with the polarity of the power supply 28 indicated in FIGURE 1. The transistors are selectively actuated by means of negative pulses applied to their bases. The transistors 38, 40, 42 and 44 are selectively actuated to write information into the memory, and the transistors 39, 41, 43 and 45 are operated to read information stored therein. The transistors 38—45 may be conventional switching transistors such as type 2N601 which saturate and thereby exhibit negligible resistances between their emitter and collector terminals when actuated. The regulation of the voltage produced by the power supply 28 provides the supply with an internal impedance substantially lower than that of the resistors R1—R8.

The operation of the memory of FIGURE 1 will readily be understood by consideration of some examples. Assume that the memory has been cleared of stored information and that, in this condition, the magnetic cores are all magnetized in the ZERO state. Also, we may define the ONE state as the direction of magnetization resulting from current passing from right to left (FIGURE 1) in the X conductors 18 and 20 and from top to bottom in the Y conductors 22 and 24 (using the positive current convention). The ZERO state results from currents flowing in the opposite directions.

If it is desired to write a ONE into the core 10, negative pulses are applied to the bases 38c and 44c of the transistors 38 and 44. This grounds the ends of the conductors 18 and 22 adjacent the resistors R1 and R7. Current from the power supply 28 then flows from the ground terminal 28b of the supply to the bus 46 and thence through the transistors 38 and 44 to the X conductor 18 and Y conductor 22. The currents in these two conductors pass through the resistors R2 and R8 and back to the terminal 28a of the power supply. The regulated voltage of the power supply 28 has the correct value in combination with the resistors R1—R8 to pass through each conducting X or Y conductor one half the current required for reversal of the magnetization of a magnetic core.

More specifically, the values of the voltage V of the supply 28 and resistors R2 and R8 in series with the conductors 18 and 26 are such as to provide a half unit of current through each of these conductors when the bases 38c and 44c are supplied with negative pulses. The two half-unit currents carried by the conductors 18 and 22 through the core 10 are in the same direction through the core, and therefore there is a resultant core current sufficient to magnetize the core in the ONE direction. The conductors 18 and 22 also carry half units of current through the cores 12 and 14, but this amount of current is insufficient to alter the magnetization of these cores.

In like manner, others of the cores may be selected for the writing-in of ONE's in the memory. For example, a ONE may be stored in the core 16 by simultaneously pulsing the transistors 40 and 42, or in the core 14 by pulsing transistors 40 and 44. If a ZERO is to be stored in a core, it is merely left in its initial cleared or ZERO state.

If it is then desired to read the information contained in the core 10, the transistors 39 and 45 are pulsed, thereby grounding the ends of the conductors 18 and 22 adjacent the resistors R2 and R8. Half units of current then flow through each of the conductors 18 and 22 in the opposite direction from the writing currents. The total current passing through the core 10 is therefore a full unit, sufficient to reverse the magnetization of the core and return it to the ZERO state. The core is then cleared for the writing-in of new information in the manner described above. The change in magnetization of the core 10 is indicated by the appearance of a voltage pulse across the terminals 26a and 26b of the sensing conductor 26. Again, the conductors 18 and 22 carry half units of current through the cores 12 and 14, insufficient to affect the magnetic states of these latter cores.

In order to read the information in the core 12, the transistors 39 and 43 are pulsed to ground the ends of the conductors 18 and 24 connected to the resistors R2 and R6. A full unit of current then passes through the core 12, but since this core is already in the ZERO state, there will be no change in magnetization thereof. Accordingly, there will be an absence of a voltage pulse across the terminals 26a and 26b indicating the ZERO. In other words, the presence of a pulse across these terminals indicates the storage of a ONE in the selected core, and the absence of such a pulse indicates a ZERO.

The inductances of each of the conductors 18—24 will generally be substantially equal. Moreover, the resistances of these conductors are much less than the resistances of the resistors R1—R8 in series with them. Hence, the resistances of the conductors may vary appreciably as permitted by standard wire tolerances without significantly affecting the magnitudes of the currents through the individual conductors.

It will be understood that while the four-core memory of FIGURE 1 fully illustrates the principles of our invention, the memories actually used in representative applications comprise many more rows and columns of magnetic cores. For example, there may be sets or planes of cores, each containing 64 rows and 64 columns. A number of planes may be stacked, one above the other, with a single row conductor passing through a row comprising a vertical stack of individual rows, one in each plane in the stack. Similarly, a single column conductor passes through each individual column in a stack of columns. Thus, if current is passed through a row conductor, a half unit of current passes through each core in the corresponding row in each plane. Current through a column conductor is carried through each of the corresponding columns in the various planes. There is a sensing conductor in each plane.

It will be apparent that each time a row and column conductor are energized, there will be in each plane a single core surrounding a full unit of current carried by the selected conductors. Thus, during the reading process, the contents of a vertical stack of single cores is retrieved from the memory by means of the sensing conductor in the individual planes. In the writing process, however, the writing current should be capable of affecting the magnetization of only those cores which are to store ONE's. The cores which are to store ZERO's should, as pointed out above, be left in the cleared condition. Therefore, each plane is provided with an inhibit winding passing through all the cores therein. Whenever information is read into a stack of cores, the row and column conductors are energized with half units of current in the writing direction as described above. Half-unit currents in the read direction are simultaneously passed through the inhibit windings threaded through the cores which are to remain in the ZERO state. This cancels out half the magnetizing force resulting from the two half-unit currents carried by the row and column conductors and prevents magnetization of these cores in the ONE direction. The other cores in the selected stack change to the ONE state in the manner previously described.

It will be apparent that selection of row and column conductors and control of currents therein in a multi-plane memory may be accomplished by our invention in the same manner as in the single plane units described herein. Currents in the inhibit windings may also be controlled in this manner.

From the above, it will be apparent that, in general, the resistors R1–R8 will have equal resistances. This common resistance is determined by the desired rise time of the current pulses through the X and Y conductors 18–24 following the switch-closing action of the transistors 38–45 upon actuation thereof. The timing is governed by a well-known relationship between this resistance and the inductance of the conductors. When the resistance is thus computed, the output voltage V of the supply 28 is set to provide individual conductor currents of one-half unit as defined above. The regulation of the supply 28 maintains the voltage V at this level, and the X and Y conductor currents are thereby kept at their correct values.

The circuit of FIGURE 1 requires but one power supply, thereby simplifying control of the currents through the row and column conductors, as well as the inhibit windings described above. This feature is of particular advantage in setting the voltage V to adjust the currents to their proper one-half unit values and also in controlling the voltage in response to environmental factors such as temperature which change the magnetization characteristics of the individual cores and thereby alter the current requirement. Moreover, the use of a voltage source, i.e., the power supply 28 in series with the individual switching transistors 39–45, renders insignificant any changes in the internal impedance of the voltage source, since this impedance is so much smaller than the resistances of the resistors R1–R8.

It will be noted that each transistor in the circuit of FIGURE 1 carries a full unit of current when switched on, even though it causes only a half unit to flow through the X or Y conductor to which it is connected. For example, when the transistor 38 is pulsed, a half unit of current flows through it to the conductor 18 and resistor R2, and roughly, another half unit flows through it to the resistor R1 and back to the power supply by way of the bus 30. This presents no real problem, since available transistors, including the type 2N601, are fully capable of handling this current requirement.

In FIGURE 2 we have illustrated a second embodiment of our invention using a somewhat different switching arrangement. Single pole-double throw switches S1 and S2 are interposed between the busses 30 and 34, and 32 and 36, respectively, and both terminals 28*a* and 28*b* of the power supply 28, the connection to the terminals 28*b* being by way of a ground connection. Each of the switches normally connects its associated busses to ground. However, upon the application of a positive pulse to an input terminal S1*a* or S2*a*, the ground connection of the particular switch is broken and the associated bus is connected to the terminal 28*a* of the power supply. In each case, the switches provide low impedance paths, as will be explained below.

Thus, the switches S1 and S2, together, operate to regulate the polarity of the voltage from the supply 28 applied across the X and Y conductors 18, 20, 22 and 24. With a positive pulse applied to switch S1 and no pulse applied to the switch S2, the busses 30 and 34 are given a negative potential and the busses 32 and 36 a positive potential. On the other hand, if a positive pulse is applied to the terminal S2*a* and the switch S1 is left in its normal position, the negative potential will be applied to the busses 32 and 36, and the busses 30 and 34 will be connected to the positive terminal 28*b*. In this manner, the switches S1 and S2 control the direction of currents through the individual magnetic cores, which are selected in a manner presently to be described, and thereby determine whether writing or reading is to take place. The function of the switches S1 and S2 of FIGURE 2 is thus similar to one function of each of the transistors 38–45 of FIGURE 1 in that the latter also control the directions of the currents through the X and Y conductors.

Still referring to FIGURE 2, the X and Y conductors are connected in series with bidirectional switching transistors 52, 53, 54 and 55, as well as the resistors R1, R3, R5 and R7. Resistors R2, R4, R6 and R8 are not needed in this embodiment, since current flowing in both directions through the X and Y conductors 18–24 passes through the resistors R1, R3, R5 and R7.

The resistances of the resistors R1, R3, R5 and R7 and the voltage of the power supply 28 of FIGURE 2 are selected in the same manner as their counterparts in FIGURE 1. Accordingly, assuming that a ONE is to be stored in the core 10, a positive pulse is applied to the terminal S2*a*, and the busses 32 and 36 are thereby supplied with negative voltages. At the same time, negative pulses are applied to the transistors 52 and 55 and half units of current thereby flow from right to left in the X conductor 18 and from top to bottom in the Y conductor 22. A full unit of current is thereby passed through the core 10 which is then magnetized in the ONE direction. In like manner, the core 12 might be selected by pulsing the transistors 52 and 54. The transistors 52–55 thus accomplish the second function of the transistors 38–45 of FIGURE 1, viz., selecting the individual X and Y conductors through which half units of current are to be passed.

The reading function is accomplished by applying a positive pulse to the input terminal S1*a* of the switch S1 and thereby rendering the busses 30 and 34 negative. Current will then flow in the reverse direction in the selected X and Y conductors. Assuming that the switch S1 is operated in this manner, simultaneous pulses applied to the transistors 52 and 55 will cause a full unit of current to flow through the core 10 to magnetize the core in the ZERO direction. The shift in magnetization from the ONE to the ZERO state causes a voltage pulse to appear at the terminals 26*a* and 26*b* of the conductor 26. Operation of the memory of FIGURE 2 is thus the same as that of the circuit of FIGURE 1.

The switch S2, which may have the same construction as the switch S1, is shown in detail in FIGURE 2. A transistor 60 has a collector 60*b* connected to the negative terminal 28*a* of the power supply 28 and an emitter 60*a* connected to the bus 32. The base 60*c* is connected to the terminal 28*a* by way of a resistor R9 and a biasing supply illustratively indicated as a battery 63. A transistor 62 has an emitter 62*a* connected to the positive terminal 28*b* of the power supply by way of a ground connection and a collector 62*b* connected to the bus 32. The emitter-collector paths of the transistors 60 and 62 provide the alternate conducting paths between the bus 32 and ground (positive) or the negative terminal 28*a*.

Still referring to FIGURE 2, the switch S2 includes a third transistor 64 whose emitter 64*a* is grounded and whose collector 64*b* is connected to the base 60*c*. The bases 62*c* and 64*c* of the transistors 62 and 64 are connected to the negative terminal 28*a* by a resistor R10, and the input terminal S2*a* is connected to the bases 62*c* and 64*c*. Under normal conditions, there is a negative potential on the bases 62*c* and 64*c* from the power supply terminal 28*a*, causing the transistors 62 and 64 to conduct and thereby providing a low impedance path between the bus 32 and ground. There is also a low impedance path between the base 60*c* and ground by way of the emitter-collector path through the transistor 64, and with the base 60*c* at ground potential, the transistor 60 is cut off.

When a positive pulse is applied to the input terminal S2*a* to actuate the switch S2, both transistors 62 and 64 are cut off, thereby removing the ground connections from the bus 32 and the base 60*c*. The base 60*c* therefore obtains a negative potential from the battery 63 through the resistor R9, and the transistor 60 then conducts to provide a low impedance conducting path between its emitter 60*a* and collector 60*b*.

The bidirectional transistors 52-55 may be type 2N462 transistors, or each one may consist of a pair of type 2N601 transistors connected in parallel, with the emitter of each connected to the collector of the other. The transistors 60, 62 and 64 may be type 2N601.

It will be noted that the series resistors R1, R3, R5 and R7 in FIGURE 2 are preferably connected directly to the conductors 18–24 instead of on the opposite sides of the transistors 52–55. This prevents the base currents in the transistors from affecting the magnitudes of the currents through the selected conductors. Since all the other resistances in the circuit are small compared to the series resistors, the resistances of these resistors determine, in combination with the power supply voltage, the magnitude of the conductor currents as pointed out above. If the resistors are connected on the other sides of the transistors, the row and column currents will in part be determined by the resistors and in part by the individual transistor base currents, which must then flow either through the resistors or the row and column conductors.

Where high-speed operation is not required, the resistors connected to each of the X and Y conductors 18–24 of FIGURE 2 may be combined into single resistors connected to the busses 32 and 36 and having the same values as the individual resistors R1, R3, R5 and R7. For example, resistors R1 and R3 may be replaced by a single resistor connected between the switch S1 and the bus 30. This will considerably simplify fabrication of the memory. However, where high-speed operation is contemplated, the individual resistors should be used. The nonconducting ones of the transistors 52–

55 exhibit significant capacitances between their emitter and collector terminals. When the switch S1 or S2 is actuated together with a pair of transistors in series with the selected row and column conductors, current flows not only through the actuated transistors and the conductors in series with them, but also into the capacitances of the other transistors. If combined resistors are used, the latter currents will subtract from the currents through the selected conductors, and at high frequencies, the proportion of the resistor currents diverted from the desired paths will be large enough to serve as a cause of error. In fact, it appears that some of the deficiencies of prior circuits are due to capacitive currents of this nature.

On the other hand, the individual series resistors R1, R3, R5 and R7, shown in FIGURE 2, serve to isolate each row and column conductor from the effect of currents through the other conductors. The voltage across the series combination of a selected conductor and its series resistor is maintained constant by the regulated power supply 28. Capacitive currents in the nonconducing transistors do not affect this voltage and therefore cannot affect the currents through the selected conductors.

The transistors 52–55 and resistors R1, R3, R5 and R7 of FIGURE 2 should be connected to the ends of the X and Y conductors electrically adjacent the read switch S1, as illustrated in the drawing. When both switches S1 and S2 are at ground potential, all the X and Y conductors 18–24 are also at this potential. When the switch S2 is actuated, the voltages on all the X and Y conductors are changed to the level at the terminal 28*a* of the power supply 28. This results in currents in these conductors because of the capacitances between the conductors and other conductors at other potentials. The currents in turn induce voltages in the sensing conductor 26, causing noise at the terminals 26*a* and 26*b*.

Since the voltage across the terminals 26*a* and 26*b* is ascertained only during the reading process, the presence of this noise during writing, when the switch S2 is actuated, presents no problems. During reading, when the switch S1 is actuated, only the selected X and Y conductors undergo an appreciable change in voltage, since the other conductors are directly connected to ground through the switch S2. Therefore, the noise problem is substantially mitigated. If the transistors 52–55 and the resistors in series with them were connected at the write switch ends of the X and Y conductors, there would be a considerably greater noise problem.

The circuit of FIGURE 2 has certain advantages in that a resistor is required at only one end of each of the X and Y conductors, thereby cutting in half the number of these resistors. Furthermore, the number of transistors required in the circuit of FIGURE 2 is fewer in memories having a large number of cores. For example, in a memory containing 64 rows and 64 columns of cores, the circuit of FIGURE 1 requires 256 transistors, whereas the circuit of FIGURE 2 requires but 134 transistors.

Thus, we have described a novel magnetic core memory including driving or current control circuits which provide greater reliability than the circuits previously used for memories of this type. Our memories use low impedance, constant voltage sources comprising regulated power supplies and low impedance switches to supply the currents through the X and Y conductors. Resistors in series with the conductors regulate the timing of the current pulses through the conductors, and control of the regulated power supplies maintains the peak current through each conductor at its correct one-half unit value. With the impedances of the switches thus being negligible in comparison with the resistances of the series resistors and with the voltage regulation of the power supply, there can be no undesirable variations in the currents through the individual conductors. It will be apparent that the stability and reliability of our circuits are considerably greater than those of prior memories and the driving circuits incorporated in them. Furthermore, our circuits pass currents through the conductors in either direction without complication, and a single power supply may be used to provide unitary control of both the X and Y currents in both directions as well as currents through the inhibit windings in a multi-plane memory. This facilitates compensation of the current levels for changes in characteristics of the magnetic cores.

It will be understood that while our invention has been specifically described with respect to toroidal cores, cores of other shapes may be used. For example, the cores may consist of segments of magnetic film, with the row and column conductors crossing over the individual segments.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A magnetic core memory comprising, in combination, a plurality of magnetic cores schematically arranged in rows and columns, column conductors magnetically coupled to the cores in the respective columns, row conductors magnetically coupled to cores in the respective rows, a substantially constant voltage source and means connecting said voltage source across said conductors, said voltage source including a power supply and low impedance switching means adapted to selectively connect individual column and row conductors to said power supply in either polarity to effect writing or reading of information in said memory, a separate impedance element in series between each of said conductors and said voltage source, each of said elements having a substantially higher impedance at a frequency corresponding to the rate of operation of said memory than the impedance of said voltage source and the impedance of the conductor in series with the element.

2. The combination defined in claim 1 in which said impedance elements are resistors.

3. The combination defined in claim 2 in which said resistors have substantially the same resistance.

4. The combination defined in claim 2 in which the resistance of each resistor is such as to pass through each conductor selected by said switching means one half the current required to change the magnetization of one of said cores.

5. The combination defined in claim 2 in which the resistance of each resistor has a value providing the desired rise time of the current pulse passing through the selected line to which the resistor is connected.

6. The combination defined in claim 2 in which each of said resistors is directly connected to the conductor in series with it.

7. A magnetic core memory comprising, in combination, a plurality of magnetic cores schematically arranged in rows and columns, column conductors magnetically coupled to the cores in the respective columns, row conductors magnetically coupled to the cores in the respective rows, a substantially constant voltage source, said voltage source including a low impedance power supply provided with first and second terminals of opposite polarity, a separate resistor in series with each of said conductors, said resistors having first terminals connected to one end of each of said conductors and second terminals connected to said first terminal of said power supply, and low impedance switches connected between each end of each of said conductors and said second terminals of said power supply, whereby simultaneous actuation of one of said switches connected to said column conductors and one of said switches connected to said row conductors passes a current through both ones of said conductors and a combined current in close proximity to the core coupled to both of said conductors.

8. The combination defined in claim 7 in which the resistances of said resistors are such as to provide the desired rise time of the current pulses through said column and row conductors following actuation of said switches.

9. The combination defined in claim 8 in which the values of said resistors are such as to pass through each of the selected row and column conductors one half the current required to reverse the magnetization of a core.

10. The combination defined in claim 7 including a sensing conductor coupled to each of said cores.

11. A magnetic core memory comprising, in combination, a plurality of magnetic cores schematically arranged in rows and columns, column conductors magnetically coupled to the cores in the respective columns, row conductors magnetically coupled to the cores in the respective rows, a power supply having first and second terminals of opposite polarity, single pole-double throw switching means providing alternative reversible conducting paths between adjacent ends of said row and column conductors and said first and second terminals of said power supply, thereby to apply the voltage from said supply across said conductors with selected polarity, bidirectional switches in series with each of said conductors, actuation of one of said switches connected to one of said row conductors selecting said one row conductors for the passage of current from said power supply and selection of one of said switches in series with one of said column conductors selecting said one column conductor for passage of current from said power supply, and a separate resistor in series with each of said selected conductors, the impedances of said power supply, said single pole-double throw switching means and said switches being substantially less when said switches and switching means conduct than the resistances of said series resistors.

12. The combination defined in claim 11 in which the resistance of each of said resistors is such as to provide the desired rise time of the current pulses through said selected conductors following actuation of said switches.

13. The combination defined in claim 12 in which the resistances of said resistors provide a current through each selected conductor equal to one half the current required to reverse the magnetization of one of said cores.

14. The combination defined in claim 11 including a sensing conductor magnetically coupled to each of said cores.

15. The combination defined in claim 11 in which each of said resistors is directly connected to the conductor in series with it.

16. A magnetic core memory of the type comprising a plurality of magnetic cores, row and column codnuctors magnetically coupled to said cores, energizing means for passing through a selected row conductor and a selected column conductor one half the current required to change the direction of magnetization of a selected core coupled to both of said conductors, and means for sensing changes in magnetization of said cores, said energizing means comprising a substantially constant voltage source and means connecting said source across said conductors, said voltage source including a power supply and switching means adapted to selectively connect individual column and row conductors to said power supply in either polarity to effect writing or reading of information in said memory, a separate resistor in series between each conductor and said power supply, the resistance of each of said resistors having a value providing the desired rise time of the current passing through the selected line to which the resistor is connected, the voltage of said power supply being such as to pass through each selected conductor one half the current required to change the magnetization of said selected core, the impedances of said power supply and said switching means being substantially less than that of said resistors.

17. A driving circuit for a magnetic core memory having row and column conductors coupled to the magnetic cores therein, said driving circuit comprising, in combination, a power supply, switching means adapted to selectively and simultaneously connect a row conductor and a column conductor to said power supply in either polarity to effect writing or reading of information in said memory and a separate resistor in series with each of said selected conductors and said power supply, the value of each of each of said resistors being such as to provide, in combination with the inductance of the selected conductor connected thereto, the desired rise time of the current passing through the selected conductor after actuation of said switching means, the voltage of said source being such as to pass through each selected conductor one half the current required to change the magnetization of a core, the impedances of said power supply and switching means being substantially less than that of each of said resistors.

18. A magnetic core memory comprising, in combination, a plurality of magnetic cores schematically arranged in rows and columns, column conductors magnetically coupled to the cores in the respective columns, row conductors magnetically coupled to the cores in the respective rows, a power supply having first and second terminals of opposite polarity, read switching means arranged to provide a conducting path from adjacent first ends of said row and column conductors to alternate ones of said terminals, write switching means arranged to provide a conducting path from the other ends of said row and column conductors to alternate ones of said terminals, bidirectional switches connected between said first ends of said conductors and said read switching means, a separate resistor in series with each of said conductors, the resistance of each of said resistors being substantially greater than the combined impedances of said power supply, said switching means and the bidirectional switch and conductor in series with the resistor.

19. The combination defined in claim 18 in which each of said resistors is connected between a first end of one of said conductors and said read switching means.

20. The combination defined in claim 18 in which each of said resistors is connected between a first end of one of said conductors and the bidirectional switch in series therewith.

21. The combination defined in claim 19 in which the resistances of said resistors are substantially equal and are such as to provide in each conductor selected by actuation of the bidirectional switch in series therewith a current substantially equal to one half the current required to reverse the magnetization of one of said cores.

22. The combination defined in claim 15 in which each of said resistors is connected between one end of a conductor and the switch in series therewith.

References Cited in the file of this patent

UNITED STATES PATENTS

| | | |
|---|---|---|
| 2,840,801 | Beter | June 24, 1958 |
| 2,917,727 | Reach | Dec. 15, 1959 |
| 2,918,655 | Pulvari | Dec. 22, 1959 |
| 2,939,119 | Einsele | May 31, 1960 |

FOREIGN PATENTS

| | | |
|---|---|---|
| 555,508 | Belgium | Mar. 30, 1957 |